(12) United States Patent
Teraoka et al.

(10) Patent No.: US 7,764,442 B2
(45) Date of Patent: Jul. 27, 2010

(54) IMAGE TAKING LENS

(75) Inventors: Hiroyuki Teraoka, Osaka (JP); Junji Kitamura, Takatsuki (JP); Masao Nishiyama, Takatsuki (JP)

(73) Assignee: Komatsulite Mfg. Co., Ltd., Suita-shi (JP)

( * ) Notice: Subject to any disclaimer, the term of this patent is extended or adjusted under 35 U.S.C. 154(b) by 10 days.

(21) Appl. No.: 12/124,587

(22) Filed: May 21, 2008

(65) Prior Publication Data

US 2009/0009889 A1 Jan. 8, 2009

(30) Foreign Application Priority Data

Jul. 3, 2007 (JP) ............................. 2007-174993

(51) Int. Cl.
*G02B 9/34* (2006.01)
(52) U.S. Cl. ..................................... 359/773
(58) Field of Classification Search .................. 359/773
See application file for complete search history.

(56) References Cited

U.S. PATENT DOCUMENTS 7,453,654 B2 * 11/2008 Shinohara .................... 359/773
2007/0008625 A1 1/2007 Park et al.

FOREIGN PATENT DOCUMENTS

| JP | 2002-365529 | 12/2002 |
| JP | 2002-365531 | 12/2002 |
| JP | 2007-17984 | 1/2007 |

* cited by examiner

*Primary Examiner*—William C Choi
(74) *Attorney, Agent, or Firm*—Oblon, Spivak, McClelland, Maier & Neustadt, L.L.P.

(57) ABSTRACT

An image taking lens 1 comprises a stop 2, a first lens 3 having a positive power and biconvex configuration, a second lens 4 having a negative power and having a meniscus configuration in which a concave surface is disposed to face an object, a third lens 5 having a positive power and a meniscus configuration in which a convex surface is disposed to face an image, and a fourth lens 6 having a negative power and a meniscus configuration in which a convex surface is disposed to face the object, which are arranged in this order from the object. The lenses 3 to 6 satisfy the following formulae (1) to (4), $$3.00 < F1/d1 < 10.00 \quad (1)$$

$$-20.0 < F2/d3 < -10.0 \quad (2)$$

$$50.0 < \nu1 < 60.0 \quad (3)$$

$$20.0 < \nu2 < 30.0 \quad (4)$$

hereupon,
F1: focal length of the first lens;
F2: focal length of the second lens;
d1: a center thickness of the first lens;
d3: a center thickness of the second lens;
ν1: an Abbe's number of the first lens; and
ν2: an Abbe's number of the second lens.

2 Claims, 10 Drawing Sheets

SPHERICAL ABERRATION
(LONGITUDINAL CHROMATIC
ABERRATION)

LATERAL CHROMATIC ABERRATION

ASTIGMATISM

DISTORTION

ASTIGMATISM

DISTORTION

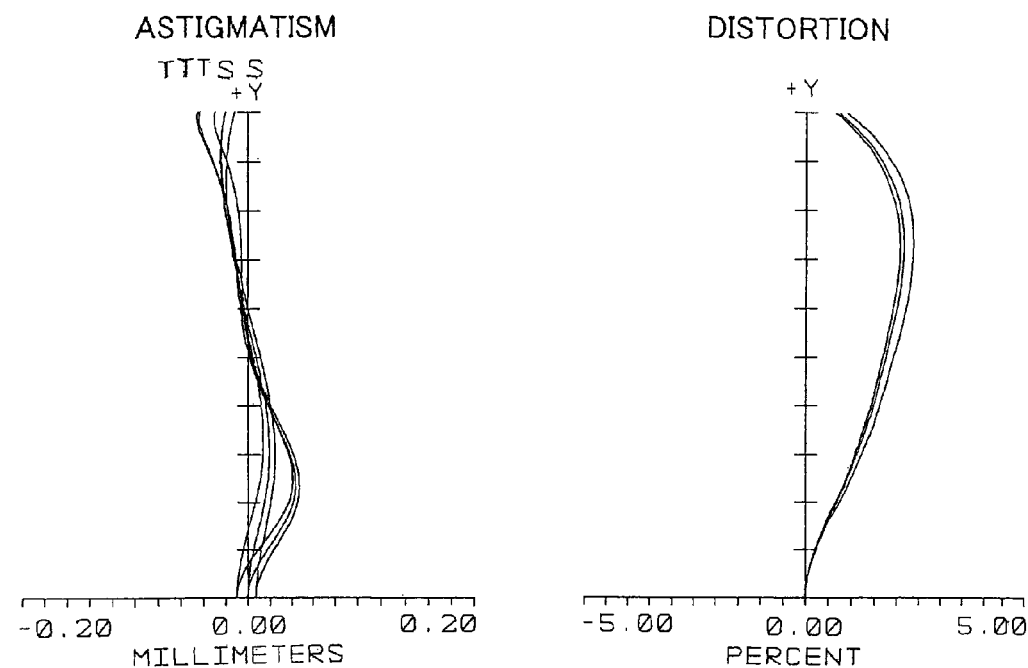

IMAGE TAKING LENS

BACKGROUND OF THE INVENTION

1. Field of the Invention

The present invention relates to an image taking lens which is suitable for a compact imaging apparatus, an optical sensor, a module camera of a mobile phone, a web camera, and so on which use a solid-state imaging device such as a high resolution CCD or CMOS.

2. Description of the Related Art

In recent years, various kinds of imaging apparatuses using a solid-state imaging device such as a CCD or a CMOS are spread in popular. Following to miniaturization and technical advantageous of the imaging device, it is required to supply a compact, lightweight image taking lens having a high optical performance.

For downsizing and weight-trimming of the image taking lens, it is conventionally proposed to configure the image taking lens with a lens system having one piece of lens, or a lens system having two pieces of lenses. Although such lens systems are advantageous for downsizing and weight-trimming, it is well known that these lens systems have a difficulty to correct aberrations such as curvature of field, and thus, splendid optical performance cannot be expected. Therefore, the image taking lens having a splendid optical performance is generally configured by more than two pieces of lenses.

Even in the image taking lens configured by three pieces of lenses, and even when all surfaces of the three pieces of lenses are shaped aspherical, it may be insufficient to correct aberrations in peripheral area when it is used for a high resolution CCD having more than two million pixels, for example. Therefore, an image taking lens configured by four pieces of lenses, by which correction of aberrations becomes easier and a high optical performance can be obtained than the image taking lens configured by three pieces of lenses, is developed, and various kinds of image taking lenses configured by four pieces of lenses are proposed.

JPA 2002-365529 discloses a conventional image taking lens comprising an aperture, a first lens having a positive power of biconvexity configuration, a second lens having a negative power of biconcavity configuration, a third lens having a positive power and in which a convex surface is disposed to face an image, and a fourth lens having a negative power and in which a convex surface is disposed to face an object, which are arranged in this order from the object. According to such a configuration, the first lens and the second lens are designed to have strong powers to downsize the image taking lens. Since a lens element of high refractive index is used for the second lens, it, however, is difficult to take a balanced allocation of power with other lens elements. Consequently, a focal length of entire image taking lens cannot be shortened or correction of aberrations may be insufficient.

JPA 2002-365531 discloses another conventional image taking lens comprising an aperture, a first lens having a positive power of biconvexity configuration, a second lens having a negative power of biconcavity configuration, a third lens having a positive power and in which a convex surface is disposed to face an image, and a fourth lens having a negative power and in which a convex surface is disposed to face an object, which are arranged in this order from the object. According to such a configuration, the first lens and the second lens are designed to have strong powers to downsize the image taking lens. Since an index of refraction of the second lens is relatively small, it may be difficult to take balanced power allocation in entire of the image taking lens. Consequently, a focal length of entire image taking lens cannot be shortened or correction of aberrations may be insufficient.

JPA 2007-17984 (US 2007-0008625 A1) discloses still another conventional image taking lens comprising a first lens group having a positive power, a second lens group having a negative power, a third lens having a positive power or a negative power, and a fourth lens group having a positive power or a negative power. Since a lens element of high refractive index is used for the second lens group, it, however, is difficult to take a balanced allocation of power with other lens elements, especially the first lens group. Therefore, it is difficult to satisfy both of downsizing the image taking lens and realizing a high optical performance. In addition, this document discloses an example of an image taking lens having a membrane filter of an optical filter to stop a part of light beams in between the lens groups. It causes the increase of a number of optical elements and processes of production.

SUMMARY OF THE INVENTION

The present invention in conceived to solve the above mentioned problems of the conventional image taking lenses, and purposes to provide an improved image taking lens configured by four lens elements, which can be downsized, and have a splendid optical characteristics by correcting aberrations properly.

An image taking lens in accordance with an aspect of the present invention comprises an aperture, a first lens having a positive power and biconvex configuration, a second lens having a negative power and having a meniscus configuration in which a concave surface is disposed to face an object, a third lens having a positive power and a meniscus configuration in which a convex surface is disposed to face an image, and a fourth lens having a negative power and a meniscus configuration in which a convex surface is disposed to face the object, which are arranged in this order from the object, and satisfying the following formulae (1) to (4), $$3.00 < F1/d1 < 10.00 \tag{1}$$

$$-20.0 < F2/d3 < -10.0 \tag{2}$$

$$50.0 < \nu1 < 60.0 \tag{3}$$

$$20.0 < \nu2 < 30.0 \tag{4}$$

hereupon,
F1: a focal length of the first lens;
F2: a focal length of the second lens;
d1: a center thickness of the first lens;
d3: a center thickness of the second lens;
ν1: an Abbe's number of the first lens; and
ν2: an Abbe's number of the second lens.

According to the above mentioned configuration, since the stop is disposed near to the object than the first lens, an entrance pupil can be located far from an imaging surface, and an incident angle to the imaging surface can be taken suitably. In addition, four lens elements which configure the image taking lens respectively have specific surface shapes, power of the lens elements are serially arranged in order of positive, negative, positive and negative, and a relation between the focal length and the center thickness of each of the first lens and the second lens is defined in a predetermined range, so that balanced power allocation of the image taking lens can be realized easily. Furthermore, the first lens and the second lens are respectively formed of materials each having the Abbe's number in a specific range, aberration in a center portion can be corrected effectively. Therefore, power of each lens element can be balanced easily. Consequently, the image taking lens has suitable optical characteristic because aberrations are preferably corrected, and the image taking lens can be downsized. Hereupon, the power of the lens is a value designated by an inverse number of the focal length.

An image taking lens in accordance with another aspect of the present invention comprises an aperture, a first lens having a positive power and biconvex configuration, a second lens having a negative power in which a concave surface is disposed to face an object, a third lens having a positive power and a meniscus configuration in which a convex surface is disposed to face an image, and a fourth lens having a negative power and a meniscus configuration in which a convex surface is disposed to face the object, which are arranged in this order from the object, and satisfying the following formulae (5) to (8), $$1.500<n1<1.580 \quad (5)$$

$$1.580<n2<1.650 \quad (6)$$

$$50.0<v1<60.0 \quad (7)$$

$$20.0<v2<30.0 \quad (8)$$

hereupon,
n1: an index of refraction of the first lens;
n2: an index of refraction of the second lens;
v1: an Abbe's number of the first lens; and
v2: an Abbe's number of the second lens.

According to such a configuration, when the index of refraction and the Abbe's number of a material for each of the first lens and the second lens are defined in a predetermined range, substantially the same effects as the above mentioned effects can be obtained.

An image taking lens in accordance with still another aspect of the present invention comprises an aperture, a first lens having a positive power and biconvex configuration, a second lens having a negative power and having a meniscus configuration in which a concave surface is disposed to face an object, a third lens having a positive power and a meniscus configuration in which a convex surface is disposed to face an image, and a fourth lens having a negative power and a meniscus configuration in which a convex surface is disposed to face the object, which are arranged in this order from the object, and satisfying the following formulae (11) to (14), $$-0.95<F1/F2<-0.60 \quad (11)$$

$$40.0<F1/d1<10.00 \quad (12)$$

$$2.80<F3/d5<5.20 \quad (13)$$

$$-10.0<F4/d7<-3.00 \quad (14)$$

hereupon,
F1: a focal length of the first lens;
F2: a focal length of the second lens;
F3: a focal length of the third lens;
F4: a focal length of the fourth lens;
d1: a center thickness of the first lens;
d5: a center thickness of the third lens; and
d7: a center thickness of the fourth lens.

The image taking lens in accordance with the present invention can contribute to carry out technical advantage, high-performance and miniaturization of digital equipment such as a mobile phone.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, in which:

FIGS. 13A and 13B are graphs respectively showing astigmatisms and distortions of the image taking lens in the third practical example;

FIG. 14 is a graph showing spherical aberrations (longitudinal chromatic aberrations) of an image taking lens in a comparative example;

DETAILED DESCRIPTION OF THE EMBODIMENT

Figure 1:
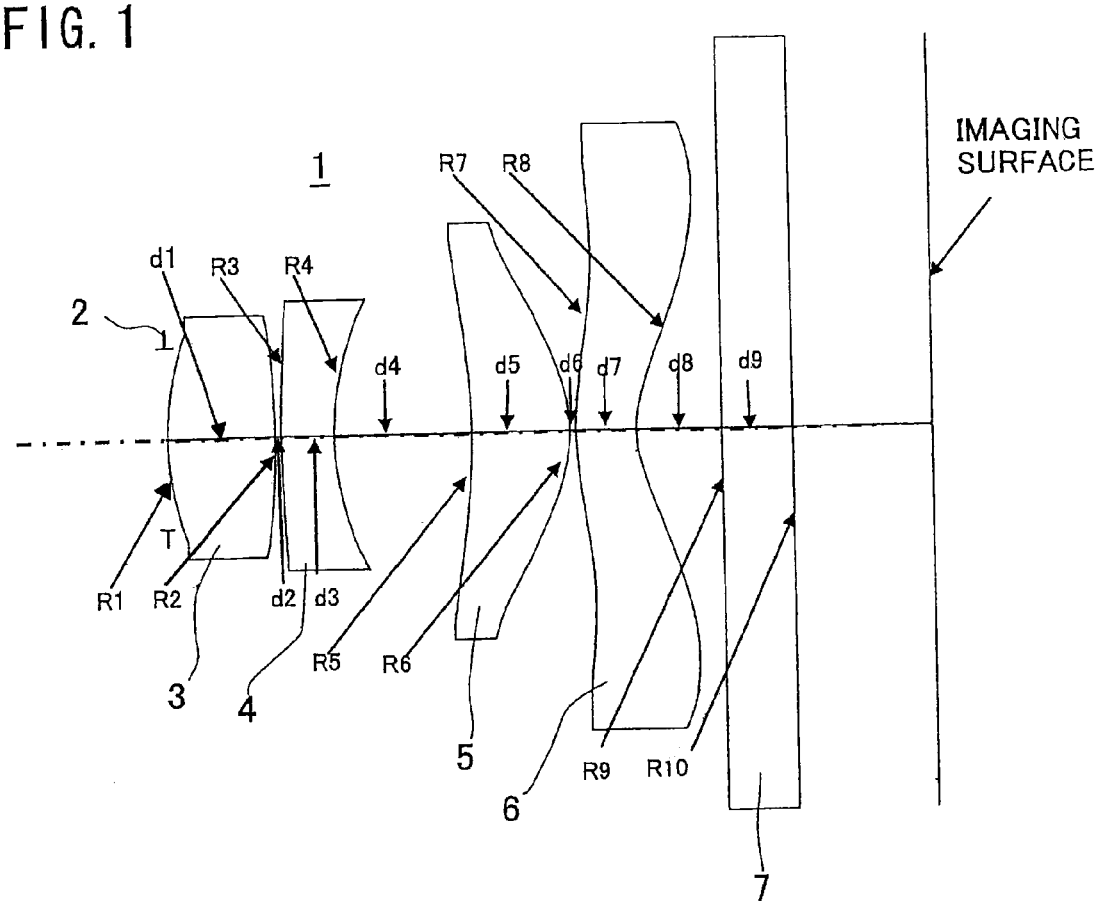
FIG. 1 is a diagram showing a basic configuration of an image taking lens in accordance with an embodiment of the present invention.

An image taking lens in accordance with an embodiment of the present invention is described with reference to the figures. A basic configuration of the image taking lens in accordance with this embodiment is shown in FIG. 1.

The image taking lens 1 comprises an aperture 1, a first lens 3, a second lens 4, a third lens 5, and a fourth lens 6, which are arranged in this order from an object (not illustrated). The optical system of the image taking lens 1 is configured by four lens elements. An optical parallel 7 made of a grass is further disposed between the fourth lens 6 and an imaging surface. As for the optical parallel 7, a cover glass, an IR (infrared light) cut filter or a low-pass filter can be used.

Since the stop 1 is disposed near to the object than the first lens 2, an entrance pupil can be located at a position distant or far from the imaging surface. Thereby, a telecentric characteristic of the image taking lens 1 can be ensured, so that an incident angle of a light beam into the imaging surface can be made preferable.

The first lens 3 is a biconvex lens element of a convex-convex configuration and has a positive power. The second lens 4 is a meniscus lens of a convex-concave configuration in which a convex surface is disposed to face the object and has a negative power. The third lens 5 is a meniscus lens element of a concave-convex configuration in which the convex surface is disposed to face an image or the image surface and has a positive power. The fourth lens is a meniscus lens of a convex-concave configuration in which the convex surface is disposed to face the object and has a negative power. The optical system of the image taking lens 1 is so-called a telephoto-type one having a power arrangement of positive, negative, positive and negative in this order from the object to the image, and larger powers are applied to the first lens 3 and the second lens 4. According to such a configuration, the image taking lens 1 can be downsized, and aberrations in a center portion of the image can be corrected, mainly. Aberrations in a peripheral portion of the image can be corrected by the third lens 5 and the fourth lens 6. At least one of surfaces of each lens element is preferably formed in an aspherical shape, and more preferably, both surfaces of each lens element are formed in aspherical shapes.

Shares of the first lens 3 and the second lens 4 are important to correct aberrations such as chromatic aberration and to downsize the image taking lens 1. When downsizing the image taking lens 1, it is advantageous to increase the positive power of the first lens 3 because a principal point is located near to the object. However, when the power of the first lens 3 becomes too large, it may cause occurrence of high order aberrations or it may cause the difficulty to balance the powers with other lens elements. Consequently, correction of aberrations becomes difficult. In the present invention, the first lens 3 is selected to be biconvex lens having a positive power. Since both surfaces of the biconvex lens have convergence, even though the first lens 3 has a relatively large positive power, it is possible not only to restrict the occurrence of high order aberrations but also to locate the principal point of the optical system in the object side. Thereby, downsizing of the image taking lens can be realized.

The second lens 4 is designed to control the positive power of the first lens 3 and to reduce burden of powers of the third lens 5 and the fourth lens 6. The second lens 4 is formed as a meniscus configuration to have a negative power in which the convex surface is disposed to face the object, and made of a material having an index of refraction larger than that of the material of the first lens 3, in consideration for balancing with the large positive power of the first lens 3. Since the second lens 4 is a meniscus lens in which the convex surface having convergence function is disposed in the object side and the concave surface having divergence function is disposed in the image side, it enables to take a power balance with the first lens 3 and to correct the aberrations easier.

In addition, it is preferable to satisfy the following formula (1), and more preferably to satisfy the following formula (1-A) with respect to a relation between a focal length F1 and a center thickness d1 of the first lens 3. Simultaneously, it is preferable to satisfy the following formula (2), more preferably the following formula (2-A) with respect to a relation between a focal length F2 and a center thickness d3 of the second lens 4.

$$3.00 < F1/d1 < 10.00 \quad (1)$$

$$4.00 < F1/d1 < 8.00 \quad (1\text{-A})$$

$$-20.00 < F2/d3 < -10.00 \quad (2)$$

$$-20.00 < F2/d3 \leq -11.83 \quad (2\text{-A})$$

Hereupon,
F1: a focal length of the first lens;
F2: a focal length of the second lens;
d1: a center thickness of the first lens; and
d3: a center thickness of the second lens.

These formulae relate to preferable correction of aberrations and balancing of power distribution of the first lens 3 and the second lens 4, and consequently, relate to the downsizing of the image taking lens 1. If the F1/d1 and F2/d3 are outside of the scope of these formulae, it may be difficult to downsize the image taking lens 1.

As for a material of the first lens 3, it is preferable to have an index of refraction in a range from 1.500 to 1.580, more preferably in a range from 1.515 to 1.550, and to have an Abbe's number in a range from 50.0 to 60.0, more preferably in a range from 53.0 to 60.0. As for a material of the second lens 4, it is preferable to have an index of refraction in a range from 1.590 to 1.650, more preferably in a range from 1.600 to 1.645, and to have an Abbe's number in a range from 20.0 to 30.0, more preferably in a range from 21.0 to 28.0. A material having an index of refraction larger than 1.650 is difficult to work and easily scratched, so that it causes the difficulty of assembling the image taking lens. In addition, when a material having an index of refraction larger than 1.650 is used as the material of the second lens 4, although it is advantageous to downsize the image taking lens 1, it causes the difficulty to adjust power balance in entire of the image taking lens 1. Thus, it is one of the features of the present invention to form the second lens 4 of a material having an index of refraction equal to or smaller than 1.650.

Since the index of refraction n1 of the first lens 3 and the index of refraction n2 of the second lens 4 are selected within the above mentioned ranges, the power of the first lens 3 and the power of the second lens 4 can be distributed preferably, and it enables to downsize the image taking lens 1. Since the index of refraction n1 of the first lens 3 is selected to be smaller than the index of refraction n2 of the second lens 4, design for the image taking lens 1 becomes easier. If the index of refraction n1 of the first lens 3 and the index of refraction n2 of the second lens 4 are outside of the scope of the above mentioned ranges, it may be difficult to downsize the image taking lens 1. Thus, it is important to satisfy an Abbe's number v1 of the first lens 3 and an Abbe's number v2 of the second lens 4 within the above mentioned ranges so as to compensate chromatic aberrations, easily. If the Abbe's number v1 of the first lens 3 and the Abbe's number v2 of the second lens 4 are outside of the scope of the above mentioned ranges, chromatic aberrations may not be corrected sufficiently.

A difference between the index of refraction n1 of the first lens 3 and the index of refraction n2 of the second lens 4 is preferably in a range from 0.030 to 0.120, more preferably in a range from 0.05 to 0.110. Thereby, the index of refraction n2 of the second lens 4 can be controlled from excessive increase. If the difference between the index of refraction n1 of the first lens 3 and the index of refraction n2 of the second lens 4 is outside the scope of the above mentioned range, it is difficult to control the unbalance of the powers of the first lens 3 and the second lens 4, and it is undesirable to down size the image taking lens 1.

When combining the first lens 3 and the second lens 4 having the indexes of refraction, the Abbe's numbers and the difference between the index of refraction n1 of the first lens 3 and the index of refraction n2 of the second lens 4 which satisfy the above mentioned conditions, it becomes easy to design the image taking lens 1 compact and to correct aberrations, mainly spherical aberration, coma aberration and chromatic aberration near to the optical axis.

In addition, it is preferable that the first lens 3 and the second lens 4 further satisfy the following formulae (11) and (12).

$$-0.95 < F1/F2 < -0.60 \quad (11)$$

$$4.00 < F1/d1 < 10.00 \quad (12)$$

Hereupon,
F1: a focal length of the first lens;
F2: a focal length of the second lens; and
d1: a center thickness of the first lens.

Furthermore, it is preferable that a relation between a radius of curvature of the first lens 3 in the object side and a radius of curvature of the first lens 3 in the image side satisfies the following formula (15).

$$-0.45 < R1/R2 < -0.05 \quad (15)$$

Hereupon,
R1: a radius of curvature of the first lens in the object side; and
R2: a radius of curvature of the first lens in the image side.

If a value of R1/R2 is outside the scope of the above mentioned range, it may be difficult to correct high order aberrations due to downsizing of the image taking lens 1.

Similarly, it is preferable that a relation between a radius of curvature of the second lens 4 in the object side and a radius of curvature of the second lens 4 in the image side satisfies the following formula (16).

$$2.50 < R3/R4 < 10.00 \quad (16)$$

Hereupon,
R3: a radius of curvature of the second lens in the object side; and
R4: a radius of curvature of the second lens in the image side.

If a value of R3/R4 is outside the scope of the above mentioned range, it may be insufficient to correct axial chromatic aberrations because the power control of the second lens 4 becomes difficult corresponding to downsizing of the image taking lens 1.

The third lens 5 bears the positive power of the image taking lens 1 with the first lens 3. As mentioned above, the first lens 3 is designed to have a large positive power so as to down size the image taking lens 1. If the power of the first lens 3 is too large, correction of aberrations may be difficult. Thus, the third lens 5 is designed to control the power of the first lens 3 so as not to be too much. In addition, the third lens 5 corrects off-axis chromatic aberrations which are difficult to be corrected by the first lens 3 and the second lens 4. Thus, the third lens 5 has is formed as a meniscus configuration to have a relatively small positive power in which the convex surface is disposed to face the image. According to such a configuration of the third lens 5, the positive power of the first lens 3 can be made suitable, and the off-axis aberrations can be corrected mainly by the third lens 5 with the fourth lens 6.

In order to design the third lens 5 easily, a material of the third lens 5 has an index of refraction n3 preferably in a range from 1.500 to 1.580 and more preferably in a range from 1.515 to 1.550, and an Abbe's number ν3 preferably in a range from 50.0 to 60.0 and more preferably in a range from 53.0 to 60.0. Since the third lens 5 is formed of the material which has the index of refraction n3 and the Abbe's number ν3 satisfying the above mentioned ranges, the design for the third lens 5 becomes easier. If the index of refraction n3 of the third lens 5 is outside the scope of the above mentioned range, it may cause the difficulty of the power distribution of the third lens 5 and the fourth lens 6. In addition, if the Abbe's number ν3 of the third lens 5 is outside the above mentioned range, it may cause the difficulty of correction of off-axis aberrations.

Furthermore, it is preferable that a relation between a focal length F3 and a center thickness d5 of the third lens satisfies the following formula (13).

$$2.80 < F3/d5 < 5.20 \quad (13)$$

Hereupon,
F3: a focal length of the third lens; and
d5: a center thickness of the third lens.

By satisfying the formula (13), it is more advantageous to downsize the image taking lens 1.

The fourth lens 6 bears the negative power of the image taking lens 1 with the second lens 4. Since the positive power of the first lens 3 is relatively large, the power of the second lens 4 tends to increase necessarily. If the power of the second lens 4 becomes too large, it becomes difficult to take power balance of the entire image taking lens 1, and thus, it is difficult to provide the image taking lens 1 having a splendid optical characteristic. Therefore, the fourth lens 6 is formed as a meniscus configuration to have a relatively small negative power in which the convex surface is disposed to face the object, so that the powers of the second lens 4 and the fourth lens 6 are balanced. In order to design the fourth lens 6 easier, the fourth lens 6 is preferably formed of a material having an index of refraction n4 is a range from 1.500 to 1.650 and an Abbe's number ν4 in a range from 20 to 60. Thereby, the off-axis aberrations can be corrected by the fourth lens 6 with the third lens 5. If the index of refraction n4 of the fourth lens 6 is outside the above mentioned range, it may cause the restriction of the power of the fourth lens 6. In addition, if the Abbe's number ν4 of the fourth lens 6 is outside the above mentioned range, it may cause the difficulty of the correction of off-axis aberrations.

Furthermore, it is preferable that a relation between a focal length F4 and a center thickness d7 of the fourth lens satisfies the following formula (14), more preferably formula (14-A).

$$-10.00 < F4/d7 < -3.00 \quad (14)$$

$$-10.00 < F4/d7 < -4.00 \quad (14\text{-}A)$$

Hereupon,
F4: a focal length of the fourth lens; and
d7: a center thickness of the fourth lens.

By satisfying the formula (14) or (14-A), it is more advantageous to downsize the image taking lens 1.

When the first to fourth lenses 3 to 6 which configure the image taking lens 1 satisfy the above mentioned configuration and formulae, the image taking lens 1 which is downsized and has a splendid optical characteristics can be provided.

The first to fourth lenses 3 to 6 are each formed of a glass material or a resin material. When a glass material is used, it is preferable to have a glass-transition temperature equal to or less than 400 degrees Celsius. Thereby, durability of a die for forming the lens can be improved.

On the other hand, a resin material is suitable for forming a lens having complex surface shapes, effectively. If the resin material has an index of refraction for sodium D-line which is measured in compliance with ASTM D542 is in a range from 1.500 to 1,650, and a light transmission in a range of wavelength 450 to 600 nm is equal to or larger than 80%, more preferably 85%, the resin material can be used with no relation to thermoplastic or thermosetting resin. The first lens 3, the third lens 5 and the fourth lens 6 may be formed of the same resin material or different resin materials. The second lens 4 is formed of a material different from the material of the first lens 3. Manufacture of the lenses of the resin material can be performed by the well-known molding methods such as injection molding, compression molding, cast molding, transfer molding and so on.

Specific examples of the resin materials used for forming the first to fourth lenses 3 to 6 are described.

As for a material of the first lens 3, it is possible to use a commercial transparent resin having an index of refraction n1 for sodium D-line measured in compliance with ASTM D542 is in a range from 1.500 to 1.600 and an Abbe's number υ1 in a range from 50.0 to 60.0 is used. As for the preferable specific examples of the transparent resin, an amorphous polyolefin resin having a ring formation such as cyclo-ring or other, polycarbonate resin and epoxy resin can be recited.

As for a material of the second lens 4, it is possible to use a commercial transparent resin having an index of refraction n2 for sodium D-line measured in compliance with ASTM D542 is in a range from 1.590 to 1.650 and an Abbe's number υ2 in a range from 20.0 to 35.0 is used. As for the preferable specific examples of the transparent resin, polyester resin including formation of 9,9-bis(4-hydroxyphenyl)fluorene, special carbonate (SP series: products of TEIJIN LIMITED), epoxy resin, thermosetting resin, and so on can be recited.

As for a material of the third lens 5, it is possible to use a commercial transparent resin having an index of refraction n3 for sodium D-line measured in compliance with ASTM D542 is in a range from 1.500 to 1.650 and an Abbe's number υ3 in a range from 50.0 to 60.0 is used. As for the preferable specific examples of the transparent resin, an amorphous polyolefin resin having a ring formation such as cyclo-ring or other, polycarbonate resin and epoxy resin can be recited.

As for a material of the fourth lens 6, it is possible to use a commercial transparent resin having an index of refraction n4 for sodium D-line measured in compliance with ASTM D542 is in a range from 1.500 to 1.650 and an Abbe's number υ4 in a range from 20.0 to 60.0 is used. As for the preferable specific examples of the transparent resin, an amorphous polyolefin resin having a ring formation such as cyclo-ring or other, polystyrene resin, polycarbonate resin, polyester resin including formation of 9,9-bis(4-hydroxyphenyl)fluorene, epoxy resin, silicone resin and so on can be recited.

It is generally known that the index refraction of the resin material varies corresponding to temperature change. For restricting the variation of the index of refraction of the resin material, microparticles of silica, niobium oxide, titanium oxide, aluminum oxide, or the like having a mean particle diameter equal to or less than 100 nm, more preferably 50 nm can be dispersive mixed into the above mentioned transparent resin materials.

The first to fourth lenses 3 to 6 which are formed of resin materials may have a flange or a rib on their outer peripheral portions. Shapes of the flange or the rib is not limited if it may not damage the optical characteristics of the lenses. From a viewpoint of molding the lenses, a thickness of a flange of a lens is preferably in a range from 70 to 130% of a thickness of the lens in an outer periphery of the lens. When the flange is formed in an outer peripheral portion of a lens, an incident light into the flange portion may cause a ghost or a flare. In such a case, a flare stop may be provided between the lenses to stop unnecessary incident lights.

At least one of surfaces of each of the first to fourth lenses 3 to 6 can be processed such as antireflection coating, IR cut coating or surface hardening, prior to be assembled into the image taking lens 1. The image taking lens 1 may be used in an imaging module for a module camera of a mobile phone, a web-camera, a personal computer, a digital still camera, an optical sensor or a monitor for various industrial apparatuses such as automobiles.

PRACTICAL EXAMPLES

Subsequently, the image taking lens 1 of the present invention is described with reference to practical examples and a comparative example. Reference symbols used in the following description of the practical examples and the comparative example are defined as follows. Units of distances, radiuses, and center thickness are respectively millimeter (mm).

F: an entire focal length of the image taking lens;
F1: a focal length of the first lens;
F2: a focal length of the second lens;
F3: a focal length of the third lens;
F4: a focal length of the fourth lens;
fno: an aperture ratio of the image taking lens;
S1: a stop
R: a radius of curvature of an optical surface, or a central radius of curvature in case of a lens;
R1: a radius of curvature of the first lens in the object side;
R2: a radius of curvature of the first lens in the image side;
R3: a radius of curvature of the second lens in the object side;
R4: a radius of curvature of the second lens in the image side;
R5: a radius of curvature of the third lens in the object side;
R6: a radius of curvature of the third lens in the image side;
R7: a radius of curvature of the fourth lens in the object side;
R8: a radius of curvature of the fourth lens in the image side;
R9: a radius of curvature of the optical parallel in the object side;
R10: a radius of curvature of the optical parallel in the image side;
d: a center thickness of the lens or a distance between the lenses;
d1: a center thickness of the first lens;
d2: a distance between the first lens and the second lens;
d3: a center thickness of the second lens;
d4: a distance between the second lens and the third lens;
d5: a center thickness of the third lens;
d6: a distance between the third lens and the fourth lens;
d7: a center thickness of the fourth lens;
d8: a distance between the fourth lens and the optical parallel;
d9: a center thickness of the optical parallel;
nd: an index of refraction for sodium D-line;
n1: an index of refraction of the first lens;
n2: an index of refraction of the second lens;
n3: an index of refraction of the third lens;
n4: an index of refraction of the fourth lens;
νd: an Abbe' number for sodium D-line;
ν1: an Abbe' number of the first lens;
ν2: an Abbe' number of the second lens;
ν3: an Abbe' number of the third lens;
ν4: an Abbe' number of the fourth lens;
ν5: an Abbe' number of the optical parallel.

Aspherical shapes of the optical surfaces of each of the first to fourth lenses 3 to 6 which configure the image taking lens 1 are expressed by the following polynomial equation (10), when y-axis designates an optical axis in which a light traveling direction corresponds to positive direction, and x-axis designates a direction perpendicular to the optical axis.

$$y=(x^2/R)/[1+\{1-(k+1)(x/R)^2\}^{1/2}]+A4x^4+A6x^6+A8x^8+A10x^{10}+A12x^{12} \quad (10)$$

Hereupon, the symbol "R" designates a radius of curvature on the optical axis, the symbol "k" designates a coefficient of cone, and the symbols "A4", "A6", "A8", "A10" and "A12" respectively designate aspherical coefficients.

As for aspherical surfaces of the lenses, ones expressed by the polynomial equation (10) are used in convenience. The aspherical surfaces, however, are not limited to the ones expressed by the polynomial equation (10), in particular.

First Practical Example

Figure 2:
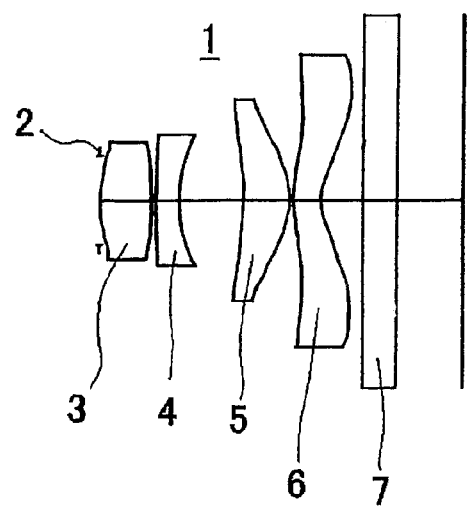
FIG. 2 is a diagram showing a configuration of an image taking lens in accordance with a first practical example.

FIG. 2 shows an arrangement of a lens system of the image taking lens in accordance with a first practical example. Radiuses of curvature of the first to fourth lenses in the object side and in the image side "R", center thicknesses of the lenses or distances between the lenses "d", indexes of refraction of the lenses "nd", and Abbe's number of the lenses "vd" are shown in table 1, and a conical coefficient "k" and aspherical coefficients "A4", "A6", "A8", "A10" and "A12" are shown in table 2.

TABLE 1

|  | r | d |  | nd |  | vd |
|---|---|---|---|---|---|---|
| S1 | ∞ | d0 = 0.010 |  |  |  |  |
| R1 | 2.170 | d1 = 0.748 | n1 | 1.5331 | v1 | 56.1 |
| R2 | −7.337 | d2 = 0.040 |  |  |  |  |
| R3 | 7.055 | d3 = 0.369 | n2 | 1.6142 | v2 | 25.4 |
| R4 | 2.008 | d4 = 0.958 |  |  |  |  |
| R5 | −4.212 | d5 = 0.689 | n3 | 1.5331 | v3 | 56.1 |
| R6 | −1.025 | d6 = 0.044 |  |  |  |  |
| R7 | 2.427 | d7 = 0.430 | n4 | 1.5331 | v4 | 56.1 |
| R8 | 0.859 | d8 = 0.600 |  |  |  |  |
| R9 | ∞ | d9 = 0.500 | n5 | 1.5168 | v5 | 64.2 |
| R10 | ∞ |  |  |  |  |  |

TABLE 2

| | Conical Coefficient | Aspherical Coefficients | | | | |
|---|---|---|---|---|---|---|
| | k | A4 | A6 | A8 | A10 | A12 |
| S1 | | | | | | |
| R1 | −7.666E−01 | −2.830E−03 | −8.262E−03 | 1.206E−02 | −2.814E−02 | 0.000E+00 |
| R2 | 3.828E+01 | −7.022E−03 | −1.661E−02 | 2.209E−02 | −1.118E−03 | 0.000E+00 |
| R3 | 7.428E+00 | −5.360E−02 | −1.603E−02 | 5.710E−02 | −1.194E−02 | 0.000E+00 |
| R4 | 1.231E+00 | −5.678E−02 | −2.117E−02 | 3.793E−02 | −1.508E−02 | 0.000E+00 |
| R5 | 4.156E+00 | 6.791E−02 | −4.237E−02 | 2.236E−02 | −6.058E−03 | 8.176E−04 |
| R6 | −5.040E+00 | −3.991E−02 | 1.997E−02 | −7.585E−03 | 4.472E−03 | −7.566E−04 |
| R7 | −7.552E+00 | −7.152E−02 | 1.502E−02 | −3.278E−04 | −1.776E−04 | 7.209E−06 |
| R8 | −4.901E+00 | −5.123E−02 | 1.238E−02 | −2.467E−03 | 2.956E−04 | −1.799E−05 |
| R9 | | | | | | |
| R10 | | | | | | |

In a condition of the first practical example, the entire focal length of the image taking lens F=4.256 mm, the focal length of the first lens F1=3.230 mm, the focal length of the second lens F2=−4.700 mm, the aperture ratio fno=3.2, the difference between the index of refraction of the first lens and the index of refraction of the second lens n2−n1=0.0811, the ratio F1/d1=4.32, and the ratio F2/d3=−12.74.

Figure 3:
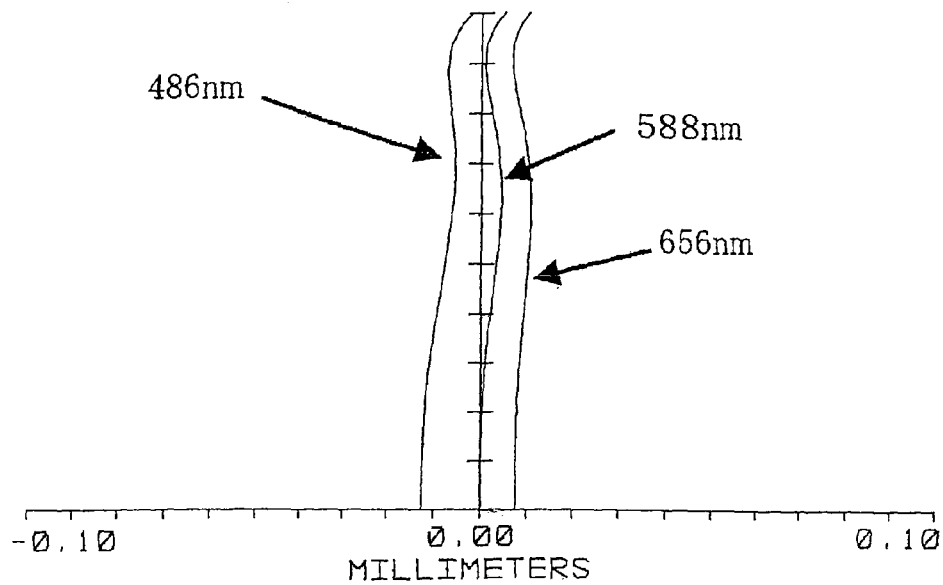
FIG. 3 is a graph showing spherical aberrations (longitudinal chromatic aberrations) of the image taking lens in the first practical example.
Figure 4:
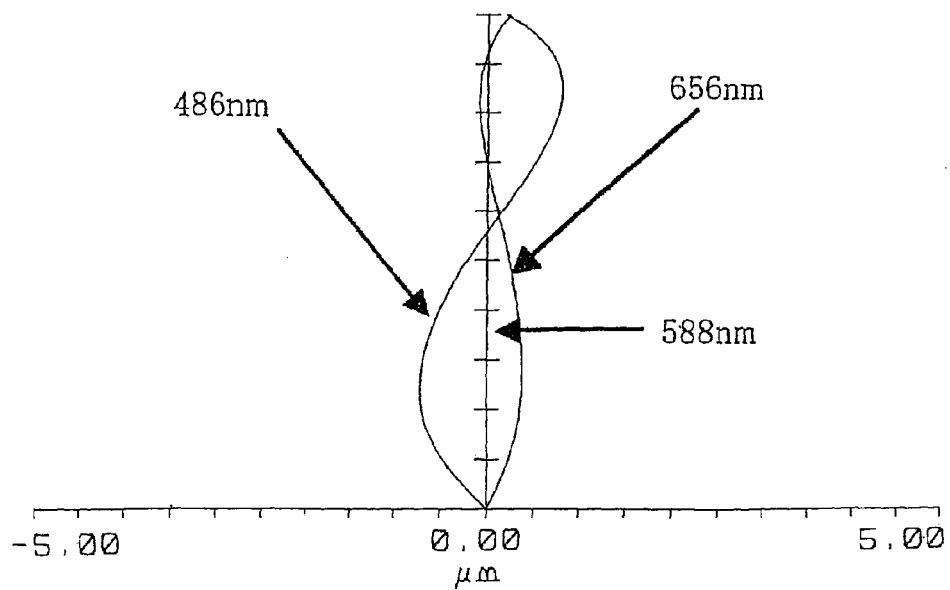
FIG. 4 is a graph showing lateral chromatic aberrations of the image taking lens in the first practical example.
Figure 5A:
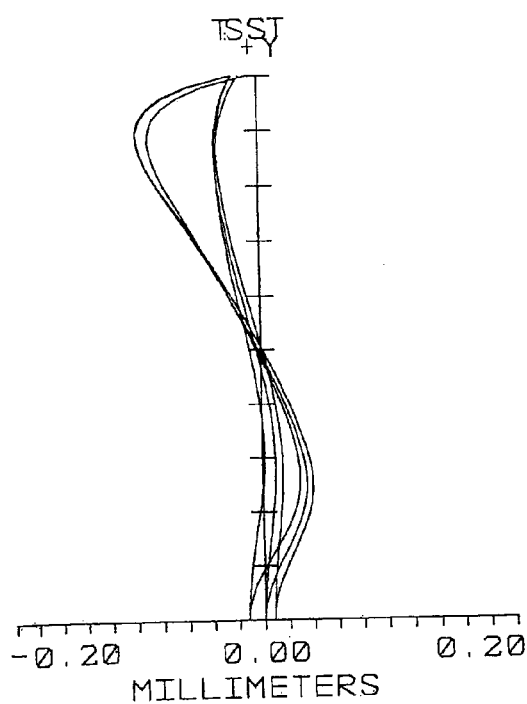
FIGS. 5A and 5B are graphs respectively showing astigmatisms and distortions of the image taking lens in the first practical example.
Figure 5B:
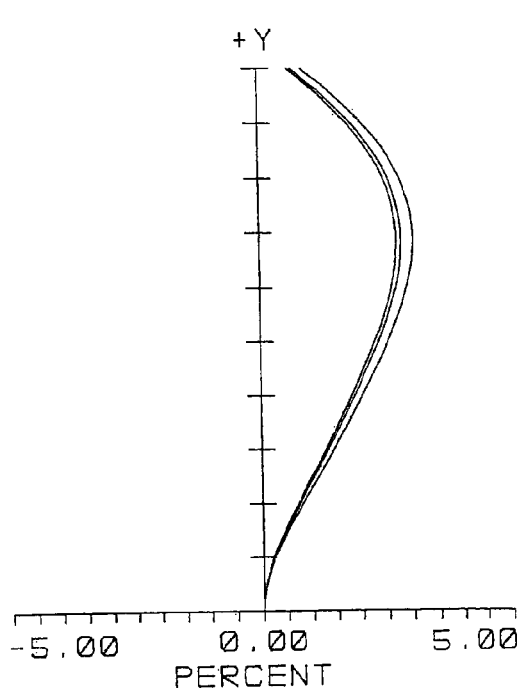

FIG. 3 shows spherical aberrations (longitudinal chromatic aberrations) of the image taking lens in the first practical example, FIG. 4 shows lateral chromatic aberrations of the same, and FIGS. 5A and 5B respectively show astigmatisms and distortions of the same.

As can be seen from these aberration graphs, although the image taking lens in the first practical example is configured by four lens elements, the image taking lens 1 is downsized to have the entire focal length "F" relatively short and suitable optical characteristics.

The aberration graphs shown in FIGS. 3, 4 5A and 5B respectively show the simulated aberrations for three wavelengths of 486 nm, 588 nm and 656 nm. In FIGS. 5A and 5B, characteristic curves designated by a symbol "S" show astigmatisms on a sagittal image surface and characteristic curves designated by a symbol "T" show astigmatisms on a tangential image surface. The same goes for the following second and fourth practical examples and the comparative example.

Second Practical Example

Figure 6:
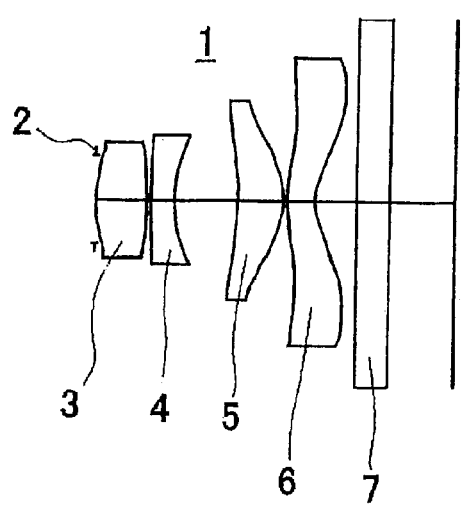
FIG. 6 is a diagram showing a configuration of an image taking lens in accordance with a second practical example.

FIG. 6 shows an arrangement of a lens system of the image taking lens in accordance with a second practical example. Radiuses of curvature of the first to fourth lenses in the object side and in the image side "R", center thicknesses of the lenses or distances between the lenses "d", indexes of refraction of the lenses "nd", and Abbe's number of the lenses "vd" are shown in table 3, and a conical coefficient "k" and aspherical coefficients "A4", "A6", "A8", "A10" and "A12" are shown in table 4.

TABLE 3

|  | r | d |  | nd |  | vd |
|---|---|---|---|---|---|---|
| S1 | ∞ | d0 = 0.010 |  |  |  |  |
| R1 | 1.981 | d1 = 0.693 | n1 | 1.5331 | v1 | 56.1 |
| R2 | −7.337 | d2 = 0.035 |  |  |  |  |
| R3 | 9.160 | d3 = 0.295 | n2 | 1.6142 | v2 | 25.4 |
| R4 | 2.146 | d4 = 1.002 |  |  |  |  |

TABLE 3-continued

|  | r | d |  | nd |  | vd |
|---|---|---|---|---|---|---|
| R5 | −4.566 | d5 = 0.724 | n3 | 1.5331 | v3 | 56.1 |
| R6 | −1.093 | d6 = 0.045 |  |  |  |  |
| R7 | 2.583 | d7 = 0.471 | n4 | 1.5331 | v4 | 56.1 |
| R8 | 0.890 | d8 = 0.600 |  |  |  |  |

TABLE 3-continued

| | r | d | nd | | vd | |
|---|---|---|---|---|---|---|
| R9 | ∞ | d9 = 0.500 | n5 | 1.5168 | v5 | 64.2 |
| R10 | ∞ | | | | | |

TABLE 4

| | Conical Coefficient | Aspherical Coefficients | | | | |
|---|---|---|---|---|---|---|
| | k | A4 | A6 | A8 | A10 | A12 |
| S1 | | | | | | |
| R1 | −5.678E−01 | −1.066E−03 | −1.993E−02 | 1.232E−02 | −9.613E−03 | 0.000E+00 |
| R2 | 3.828E+01 | −7.022E−03 | −1.661E−02 | 2.209E−02 | −1.118E−03 | 0.000E+00 |
| R3 | 1.424E+01 | −5.208E−02 | −1.465E−04 | 7.146E−02 | −3.689E−02 | 0.000E+00 |
| R4 | 1.474E+00 | −5.223E−02 | −2.714E−03 | 4.349E−02 | −2.494E−02 | 0.000E+00 |
| R5 | 4.250E+00 | 6.035E−02 | −4.287E−02 | 2.293E−02 | −5.782E−03 | 8.216E−04 |
| R6 | −5.335E+00 | −2.916E−02 | 1.959E−02 | −7.748E−03 | 4.514E−03 | −6.960E−04 |
| R7 | −7.513E+00 | −6.796E−02 | 1.552E−02 | −2.881E−04 | −1.777E−04 | 4.634E−06 |
| R8 | −4.727E+00 | −5.050E−02 | 1.312E−02 | −2.441E−03 | 2.923E−04 | −1.856E−05 |
| R9 | | | | | | |
| R10 | | | | | | |

In a condition of the second practical example, the entire focal length of the image taking lens F=4.112 mm, the focal length of the first lens F1=3.003 mm, the focal length of the second lens F2=−4.637 mm, the aperture ratio fno=3.2, the difference between the index of refraction of the first lens and the index of refraction of the second lens n2−n1=0.0811, the ratio F1/d1=4.33, and the ratio F2/d3=−15.72.

Figure 7:
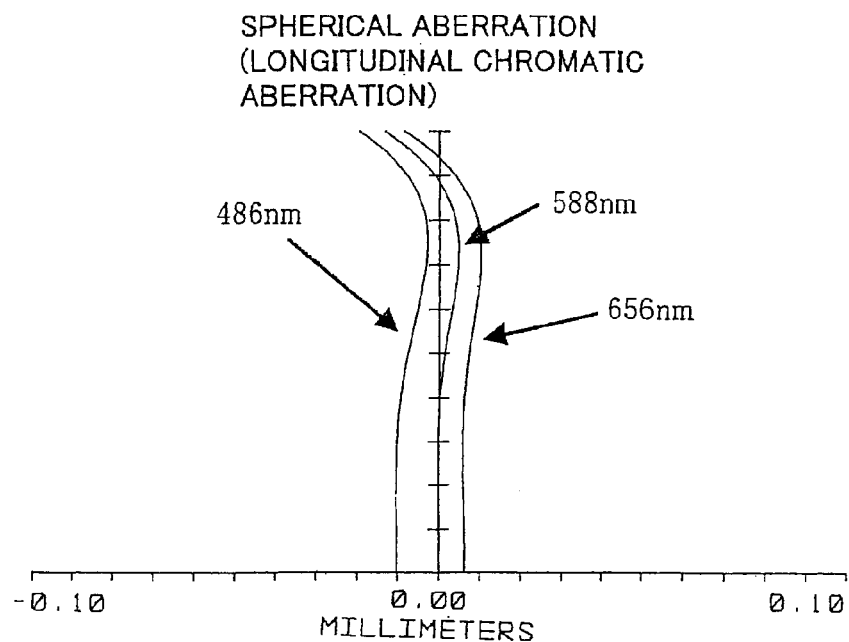
FIG. 7 is a graph showing spherical aberrations (longitudinal chromatic aberrations) of the image taking lens in the second practical example.
Figure 8:
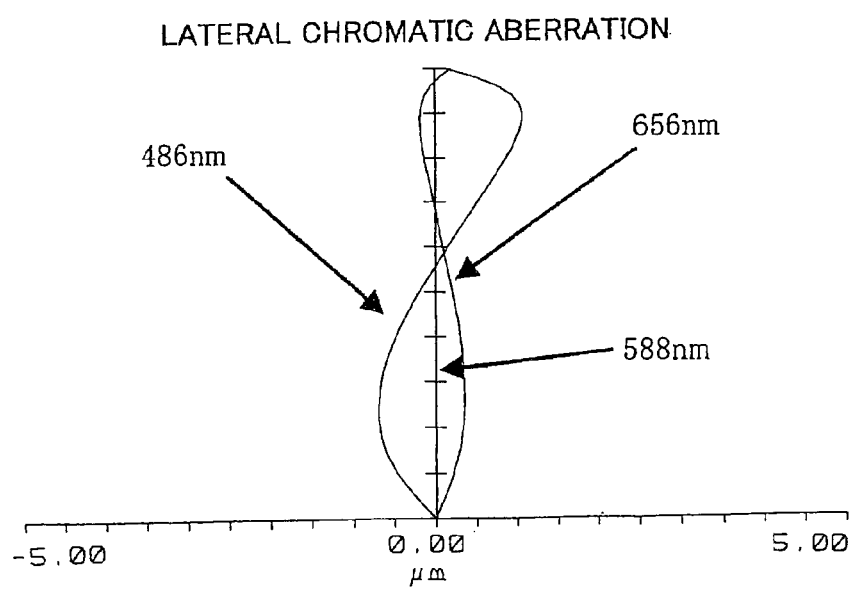
FIG. 8 is a graph showing lateral chromatic aberrations of the image taking lens in the second practical example.
Figure 9A:
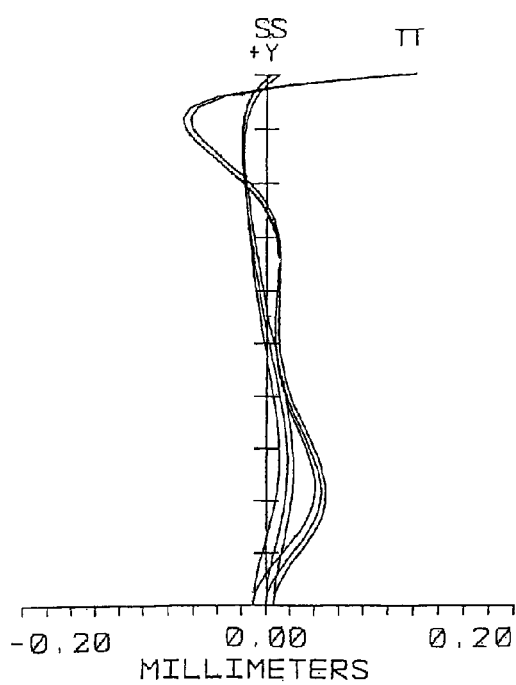
FIGS. 9A and 9B are graphs respectively showing astigmatisms and distortions of the image taking lens in the second practical example.
Figure 9B:
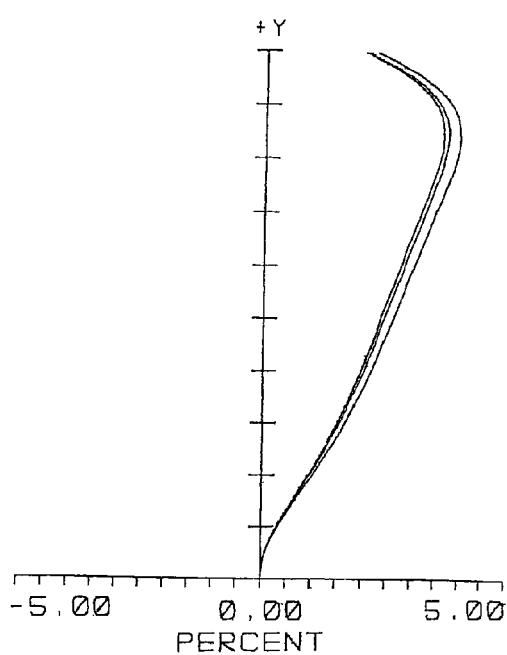

FIG. 7 shows spherical aberrations (longitudinal chromatic aberrations) of the image taking lens in the second practical example, FIG. 8 shows lateral chromatic aberrations of the same, and FIGS. 9A and 9B respectively show astigmatisms and distortions of the same.

As can be seen from these aberration graphs, although the image taking lens in the second practical example is configured by four lens elements, the image taking lens 1 is downsized to have the entire focal length "F" relatively short and suitable optical characteristics.

Third Practical Example

Figure 10:
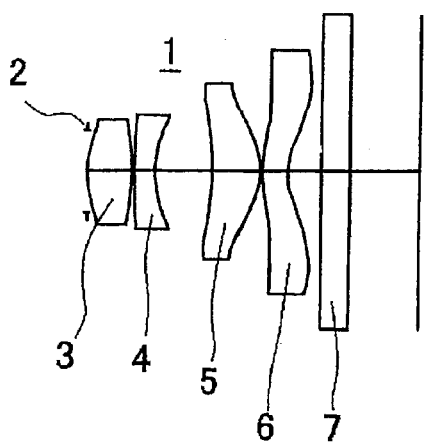
FIG. 10 is a diagram showing a configuration of an image taking lens in accordance with a third practical example.

FIG. 10 shows an arrangement of a lens system of the image taking lens in accordance with a third practical example. Radiuses of curvature of first to fourth lenses which configure a lens system of the image taking lens in the third practical example in the object side and in the image side "R", center thicknesses of the lenses or distances between the lenses "d", indexes of refraction of the lenses "nd", and Abbe's number of the lenses "vd" are shown in table 5, and a conical coefficient "k" and aspherical coefficients "A4", "A6", "A8", "A10" and "A12" are shown in table 6.

TABLE 5

| | r | d | nd | | vd | |
|---|---|---|---|---|---|---|
| S1 | ∞ | d0 = 0.010 | | | | |
| R1 | 2.169 | d1 = 0.737 | n1 | 1.5331 | v1 | 56.1 |
| R2 | −7.337 | d2 = 0.041 | | | | |
| R3 | 7.316 | d3 = 0.384 | n2 | 1.6142 | v2 | 25.4 |
| R4 | 1.980 | d4 = 0.980 | | | | |
| R5 | −3.964 | d5 = 0.835 | n3 | 1.5331 | v3 | 56.1 |
| R6 | −1.025 | d6 = 0.029 | | | | |
| R7 | 2.449 | d7 = 0.419 | n4 | 1.5331 | v4 | 56.1 |
| R8 | 0.858 | d8 = 0.600 | | | | |
| R9 | ∞ | d9 = 0.500 | n5 | 1.5168 | v5 | 64.2 |
| R10 | ∞ | | | | | |

TABLE 6

| | Conical Coefficient | Aspherical Coefficients | | | | |
|---|---|---|---|---|---|---|
| | k | A4 | A6 | A8 | A10 | A12 |
| S1 | | | | | | |
| R1 | −7.557E−01 | −2.474E−03 | −6.411E−03 | 1.314E−02 | −3.030E−02 | 0.000E+00 |
| R2 | 3.828E+01 | −7.022E−03 | −1.661E−02 | 2.209E−02 | −1.118E−03 | 0.000E+00 |
| R3 | 1.014E+01 | −5.175E−02 | −1.900E−02 | 5.677E−02 | −8.378E−03 | 0.000E+00 |
| R4 | 1.247E+00 | −5.616E−02 | −2.088E−02 | 3.803E−02 | −1.403E−02 | 0.000E+00 |
| R5 | 3.946E+00 | 6.754E−02 | −4.164E−02 | 2.262E−02 | −5.939E−03 | 8.916E−04 |
| R6 | −5.558E+00 | −4.046E−02 | 1.964E−02 | −7.657E−03 | 4.446E−03 | −7.675E−04 |
| R7 | −6.386E+00 | −7.121E−02 | 1.502E−02 | −3.203E−04 | −1.730E−04 | 8.969E−06 |

TABLE 6-continued

| | Conical Coefficient | Aspherical Coefficients | | | | |
|---|---|---|---|---|---|---|
| | k | A4 | A6 | A8 | A10 | A12 |
| R8 | −5.172E+00 | −5.222E−02 | 1.251E−02 | −2.441E−03 | 2.988E−04 | −1.770E−05 |
| R9 | | | | | | |
| R10 | | | | | | |

In a condition of the third practical example, the entire focal length of the image taking lens F=4.630 mm, the focal length of the first lens F1=3.227 mm, the focal length of the second lens F2=−4.543 mm, the aperture ratio fno=3.2, the difference between the index of refraction of the first lens and the index of refraction of the second lens n2−n1=0.0811, the ratio F1/d1=4.38, and the ratio F2/d3=−18.83.

Figure 11:
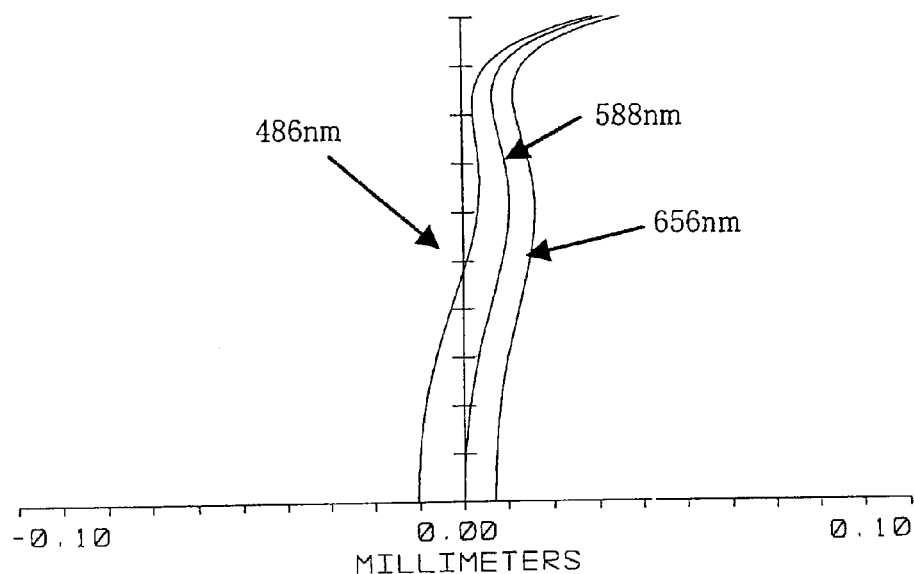
FIG. 11 is a graph showing spherical aberrations (longitudinal chromatic aberrations) of the image taking lens in the third practical example.
Figure 12:
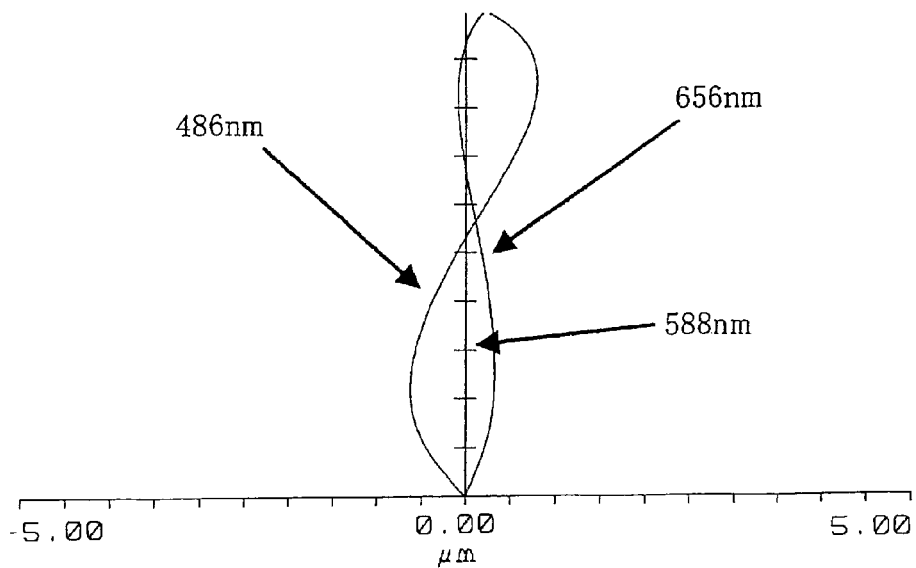
FIG. 12 is a graph showing lateral chromatic aberrations of the image taking lens in the third practical example.

FIG. 11 shows spherical aberrations (longitudinal chromatic aberrations) of the image taking lens in the third practical example, FIG. 12 shows lateral chromatic aberrations of the same, and FIGS. 13A and 13B respectively show astigmatisms and distortions of the same.

As can be seen from these aberration graphs, although the image taking lens in the third practical example is configured by four lens elements, the image taking lens 1 is downsized to have the entire focal length "F" relatively short and suitable optical characteristics.

Comparative Example

Radiuses of curvature of first to fourth lenses which configure a lens system of the image taking lens in accordance with a comparative example in the object side and in the image side "r", center thicknesses of the lenses or distances between the lenses "d", indexes of refraction of the lenses "nd", and Abbe's number of the lenses "vd" are shown in table 7, and a coefficient of cone "k" and aspherical coefficients "A4", "A6", "A8", "A10" and "A12" are shown in table 8.

In this comparative example, the first lens is formed of a material having the index of refraction n1=1.671 and the Abbe's number ν1=66.1, and the second lens is formed of a material having the index of refraction n2=1.531 and the Abbe's number ν2=32.0. The index of refraction n1 and the Abbe's number ν1 of the first lens and the Abbe's number ν2 of the second lens are outside of the scope of those of the present invention.

TABLE 7

| | r | d | nd | | vd | |
|---|---|---|---|---|---|---|
| S1 | ∞ | d0 = 0.030 | | | | |
| R1 | 2.311 | d1 = 1.066 | n1 | 1.531 | ν1 | 66.1 |
| R2 | −7.439 | d2 = 0.100 | | | | |
| R3 | 13.099 | d3 = 0.300 | n2 | 1.671 | ν2 | 32 |
| R4 | 3.449 | d4 = 0.747 | | | | |
| R5 | −2.375 | d5 = 0.798 | n3 | 1.533 | ν3 | 66 |
| R6 | −1.178 | d6 = 0.061 | | | | |
| R7 | 2.770 | d7 = 0.814 | n4 | 1.546 | ν4 | 65 |
| R8 | 1.100 | d8 = 0.420 | | | | |
| R9 | ∞ | d9 = 0.300 | n5 | | ν5 | |
| R10 | ∞ | | | | | |

TABLE 8

| | Conical Coefficient | Aspherical Coefficients | | | | |
|---|---|---|---|---|---|---|
| | k | A4 | A6 | A8 | A10 | A12 |
| S1 | | | | | | |
| R1 | −4.148E−01 | −6.820E−01 | 2.028E−01 | −4.580E−01 | 4.861E−01 | −1.924E−01 |
| R2 | −4.798E+01 | 7.530E−01 | −4.946E−01 | −9.385E−01 | −4.774E−01 | 4.278E−01 |
| R3 | | | | | | |
| R4 | | | | | | |
| R5 | −1.590E+01 | −6.688E−01 | 1.955E−01 | 9.497E−01 | −4.506E−01 | 7.995E−01 |
| R6 | −2.447E+00 | −3.556E−01 | −1.067E−01 | 1.874E−01 | −4.531E−01 | 9.130E−01 |
| R7 | −1.332E+01 | −8.162E−01 | 3.062E−01 | −5.577E−01 | 7.320E−01 | 5.747E−01 |
| R8 | −4.693E+00 | −5.684E−01 | 1.791E−01 | −3.921E−01 | 4.376E−01 | −2.189E−01 |
| R9 | | | | | | |
| R10 | | | | | | |

In a condition of the comparative example, the entire focal length of the image taking lens F=3.921 mm, the aperture ratio fno=3.2, the difference between the index of refraction of the first lens and the index of refraction of the second lens n2−n1=0.140, the ratio F1/d1=3.23, and the ratio F2/d3=−23.54.

Figure 15:
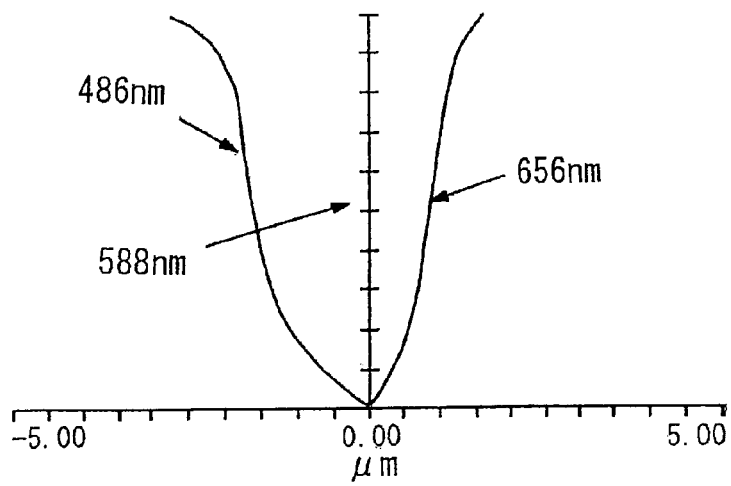
FIG. 15 is a graph showing lateral chromatic aberrations of the image taking lens in the comparative example.
Figure 16A:
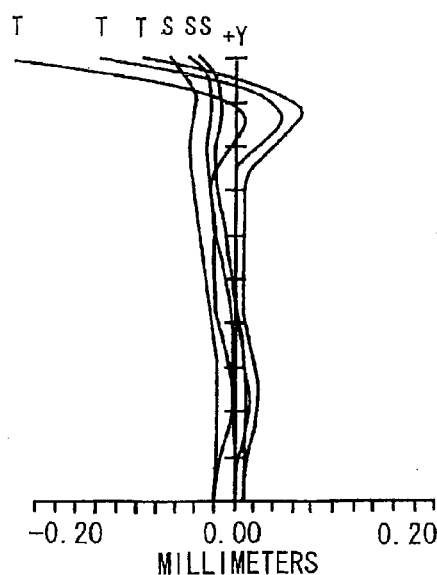
FIGS. 16A and 16B are graphs respectively showing astigmatisms and distortions of the image taking lens in the comparative example.
Figure 16B:
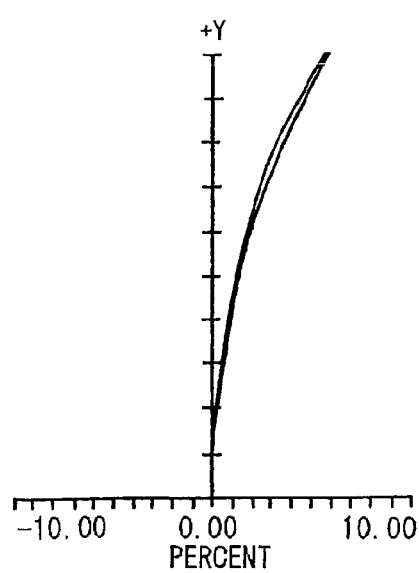

FIG. 14 shows spherical aberrations (longitudinal chromatic aberrations) of the image taking lens in the comparative example, FIG. 15 shows lateral chromatic aberrations of the same, and FIGS. 16A and 16B respectively show astigmatisms and distortions of the same.

As can be seen from these aberration graphs, although the image taking lens in the comparative example is configured by four lens elements, the image taking lens 1 is downsized to have the entire focal length "F" relatively short. Aberrations, however, are corrected insufficiently in comparison with those in the practical examples because the aberrations corresponding to the wavelengths are largely varied. Thus, optical characteristics of the comparative example are required to be improved.

Fourth Practical Example

Figure 17:
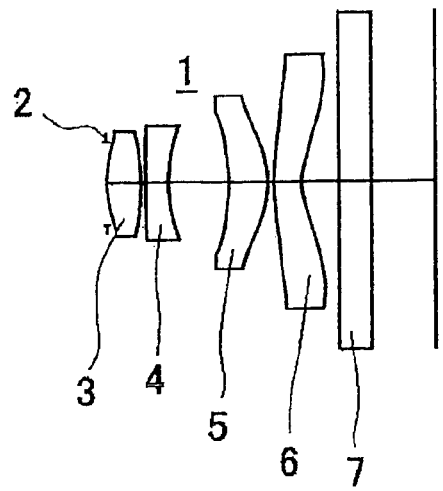
FIG. 17 is a diagram showing a configuration of an image taking lens in accordance with a fourth practical example.

FIG. 17 shows an arrangement of a lens system of the image taking lens in accordance with a fourth practical example. Radiuses of curvature of the first to fourth lenses in the object side and in the image side "R", center thicknesses of the lenses or distances between the lenses "d", indexes of refraction of the lenses "nd", and Abbe's number of the lenses "vd" are shown in table 9, and a conical coefficient "k" and aspherical coefficients "A4", "A6", "A8", "A10" and "A12" are shown in table 10.

TABLE 9

| | r | d | | nd | | vd |
|---|---|---|---|---|---|---|
| S1 | ∞ | d0 = 0.010 | | | | |
| R1 | 2.054 | d1 = 0.568 | n1 | 1.5331 | v1 | 56.1 |
| R2 | −6.019 | d2 = 0.050 | | | | |
| R3 | 21.874 | d3 = 0.370 | n2 | 1.6142 | v2 | 25.4 |
| R4 | 2.430 | d4 = 0.980 | | | | |
| R5 | −4.623 | d5 = 0.636 | n3 | 1.5331 | v3 | 56.1 |
| R6 | −1.316 | d6 = 0.050 | | | | |
| R7 | 3.343 | d7 = 0.473 | n4 | 1.5331 | v4 | 56.1 |
| R8 | 1.220 | d8 = 0.600 | | | | |
| R9 | ∞ | d9 = 0.500 | n5 | 1.5168 | v5 | 64.2 |
| R10 | ∞ | | | | | |

TABLE 10

| | Conical Coefficient | Aspherical Coefficients | | | | |
|---|---|---|---|---|---|---|
| | k | A4 | A6 | A8 | A10 | A12 |
| S1 | | | | | | |
| R1 | −1.009E+00 | −7.976E−03 | −1.842E−02 | −1.158E−02 | −1.269E−02 | 0.000E+00 |
| R2 | 3.828E+01 | −1.365E−02 | 1.722E−02 | 1.385E−02 | −4.999E−03 | 0.000E+00 |
| R3 | 1.595E+02 | −4.605E−02 | 2.147E−02 | 9.414E−02 | −8.067E−02 | 0.000E+00 |
| R4 | 1.439E+00 | −5.017E−02 | −4.632E−03 | 5.074E−02 | −3.667E−02 | 0.000E+00 |
| R5 | 7.076E+00 | 4.426E−02 | −5.050E−02 | 2.372E−02 | −7.249E−03 | −9.411E−04 |
| R6 | −5.868E+00 | −9.658E−03 | 1.322E−02 | −9.385E−03 | 4.524E−03 | −6.409E−04 |
| R7 | −4.584E+00 | −6.133E−02 | 1.652E−02 | −4.329E−04 | −2.155E−04 | −1.123E−06 |
| R8 | −5.785E+00 | −5.097E−02 | 1.351E−02 | −2.360E−03 | 2.915E−04 | −2.262E−05 |
| R9 | | | | | | |
| R10 | | | | | | |

Figure 18:
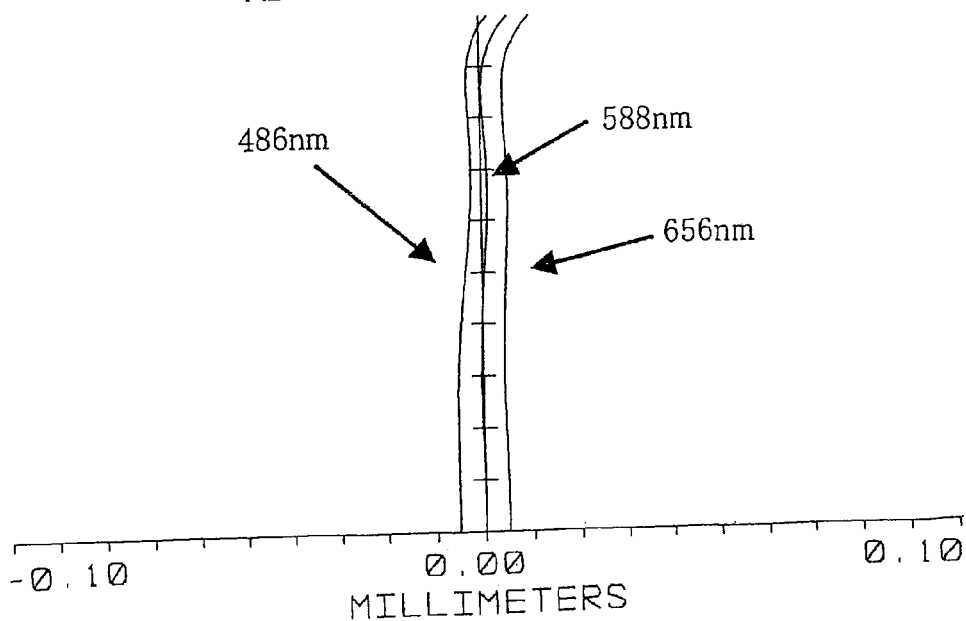
FIG. 18 is a graph showing spherical aberrations (longitudinal chromatic aberrations) of the image taking lens in the fourth practical example.
Figure 19:
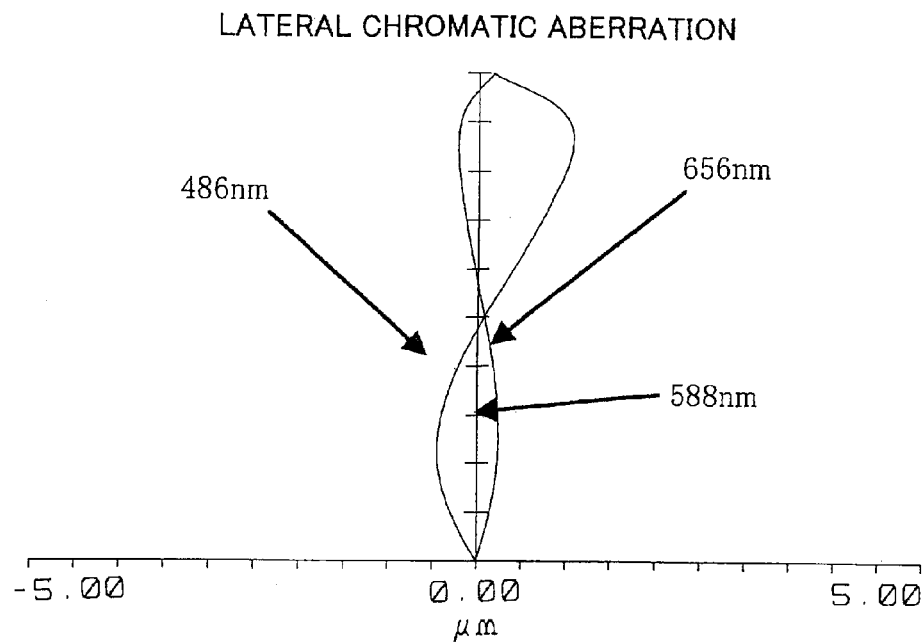
FIG. 19 is a graph showing lateral chromatic aberrations of the image taking lens in the fourth practical example.
Figure 20A:
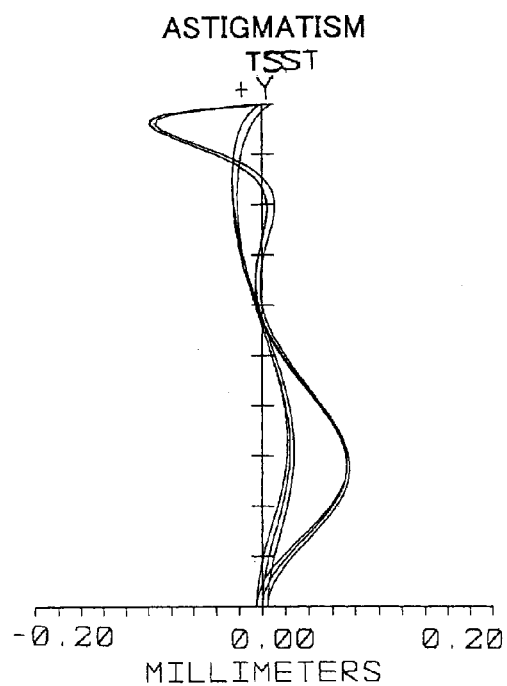
FIGS. 20A and 20B are graphs respectively showing astigmatisms and distortions of the image taking lens in the fourth practical example.
Figure 20B:
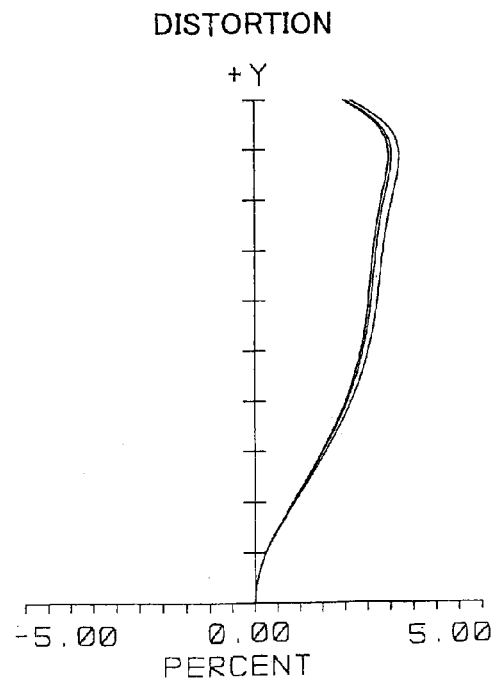

FIG. 18 shows spherical aberrations (longitudinal chromatic aberrations) of the image taking lens in the comparative example, FIG. 19 shows lateral chromatic aberrations of the same, and FIGS. 20A and 20B respectively show astigmatisms and distortions of the same.

As can be seen from these aberration graphs, although the image taking lens in the third practical example is configured by four lens elements, the image taking lens 1 is downsized to have the entire focal length "F" relatively short and suitable optical characteristics.

Table 11 shows specific values of the parameters defined in the above mentioned formulae (11) to (16) with respect to the first to fourth practical examples (examples 1 to 4).

TABLE 11

| | Example 1 | Example 2 | Example 3 | Example 4 | Remarks |
|---|---|---|---|---|---|
| F1/F2 | −0.69 | −0.65 | −0.71 | −0.66 | Formula(11) |
| F1/d1 | 4.32 | 4.33 | 4.38 | 7.75 | Formula(12) |
| F3/d5 | 3.43 | 3.57 | 2.83 | 5.08 | Formula(13) |
| F4/d7 | −6.41 | −5.98 | −6.50 | −8.26 | Formula(14) |
| R1/R2 | −0.30 | −0.27 | −0.30 | −0.34 | Formula(15) |
| R3/R4 | 3.51 | 4.27 | 3.70 | 9.00 | Formula(16) |
| Fno | 3.200 | 3.200 | 3.200 | 3.200 | |
| F | 4.256 | 4.112 | 4.630 | 4.400 | |
| F1 | 3.230 | 3.003 | 3.227 | 2.944 | |
| F2 | −4.700 | −4.637 | −4.543 | −4.484 | |
| F3 | 2.362 | 2.582 | 2.361 | 3.234 | |
| F4 | −2.757 | −2.817 | −2.725 | −3.906 | |

As can be seen from table 11, the image taking lens in accordance with the above mentioned first to force practical examples satisfy the formulae (11) to (16).

This application is based on Japanese patent application 2007-174993 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image taking lens comprising:
a stop, a first lens having a positive power and biconvex configuration, a second lens having a negative power and having a meniscus configuration in which a convex surface is disposed to face an object, a third lens having a positive power and a meniscus configuration in which a convex surface is disposed to face an image, and a fourth lens having a negative power and a meniscus configuration in which a convex surface is disposed to face the object, which are arranged in this order from the object, and satisfying the following formulae (1) to (4) and (13), $$3.00 < F1/d1 < 10.00 \quad (1)$$

$$-20.0 < F2/d3 \leq -11.83 \quad (2\text{-}A)$$

$$50.0 < v1 < 60.0 \quad (3)$$

$$20.0 < v2 < 30.0 \quad (4)$$

$$2.80 < F3/d5 < 5.20 \quad (13)$$

hereupon,
F1: focal length of the first lens;
F2: focal length of the second lens;
F3: focal length of the third lens;
d1: a center thickness of the first lens;
d3: a center thickness of the second lens;
d5: a center thickness of the third lens;
v1: an Abbe's number of the first lens; and
v2: an Abbe's number of the second lens.

2. The image taking lens in accordance with claim 1, further satisfying the following formula (9), $$0.000 < n2 - n1 < 0.120 \quad (9)$$

hereupon,
n1: an index of refraction of the first lens; and
n2: an index of refraction of the second lens.

* * * * *